United States Patent
Smith et al.

(10) Patent No.: US 9,390,280 B2
(45) Date of Patent: Jul. 12, 2016

(54) SYSTEM AND METHOD FOR OBTAINING KEYS TO ACCESS PROTECTED INFORMATION

(71) Applicant: Angel Secure Networks, Inc., Old Town, ME (US)

(72) Inventors: Benjamin Smith, Tucson, AZ (US); Daniel Sabin, Madbury, NH (US); Fred Hewitt Smith, Old Town, ME (US)

(73) Assignee: Angel Secure Networks, Inc., Old Town, ME (US)

( * ) Notice: Subject to any disclaimer, the term of this patent is extended or adjusted under 35 U.S.C. 154(b) by 352 days.

(21) Appl. No.: 14/027,425

(22) Filed: Sep. 16, 2013

(65) Prior Publication Data

US 2014/0082354 A1    Mar. 20, 2014

Related U.S. Application Data

(60) Provisional application No. 61/701,714, filed on Sep. 16, 2012.

(51) Int. Cl.
G06F 21/62    (2013.01)

(52) U.S. Cl.
CPC .... *G06F 21/6218* (2013.01); *G06F 2221/2125* (2013.01)

(58) Field of Classification Search
None
See application file for complete search history.

(56) References Cited

U.S. PATENT DOCUMENTS

| | | | |
|---|---|---|---|
| 4,408,203 A | 10/1983 | Campbell | |
| 4,658,093 A | 4/1987 | Hellman | |
| 4,696,003 A | 9/1987 | Kerr et al. | |
| 4,731,880 A | 3/1988 | Ault et al. | |
| 4,809,362 A | 2/1989 | Claus et al. | |
| 4,962,498 A | 10/1990 | May | |
| 4,999,806 A | 3/1991 | Chernow et al. | |
| 5,001,755 A | 3/1991 | Skret | |
| 5,005,122 A | 4/1991 | Griffin et al. | |
| 5,023,907 A | 6/1991 | Johnson et al. | |
| 5,155,847 A | 10/1992 | Kirouac et al. | |
| 5,247,683 A | 9/1993 | Holmes et al. | |
| 5,301,247 A | 4/1994 | Rasmussen et al. | |
| 5,317,744 A | 5/1994 | Harwell et al. | |
| 5,388,211 A | 2/1995 | Hornbuckle | |
| 5,416,842 A | 5/1995 | Aziz | |

(Continued)

FOREIGN PATENT DOCUMENTS

| EP | 0703531 | 3/1996 |
|---|---|---|
| EP | 0778512 | 6/1997 |

OTHER PUBLICATIONS

US 5,748,741, May 1998, Johnson et al. (withdrawn).

(Continued)

*Primary Examiner* — Andrew Nalven
*Assistant Examiner* — Abdulhakim Nobahar
(74) *Attorney, Agent, or Firm* — Guntin & Gust, PLC; Ralph Trementozzi (57) ABSTRACT

A server uses an encryption key to decrypt authentication information thereby facilitating communication with network-accessible applications that may be remotely located from the server. Servers can also use encryption keys to decrypt files containing sensitive data. The encryption key is obtained by a collection of software agents, each providing a portion of information necessary for generating the encryption key. Each software agent performs a respective examination, the results of which determine whether the respective portion of information is valid or not. A complete encryption key can be obtained only when all of the contributing portions of information are valid.

15 Claims, 4 Drawing Sheets

(56) References Cited

U.S. PATENT DOCUMENTS

| | | | |
|---|---|---|---|
| 5,421,009 A | 5/1995 | Platt | |
| 5,438,508 A | 8/1995 | Wyman | |
| 5,452,415 A | 9/1995 | Hotka | |
| 5,461,385 A | 10/1995 | Armstrong | |
| 5,495,610 A | 2/1996 | Shing et al. | |
| 5,509,070 A | 4/1996 | Schull | |
| 5,509,074 A | 4/1996 | Choudhury et al. | |
| 5,548,649 A | 8/1996 | Jacobson | |
| 5,594,866 A | 1/1997 | Nugent | |
| 5,638,512 A | 6/1997 | Osman et al. | |
| 5,642,394 A | 6/1997 | Rothschild | |
| 5,671,279 A | 9/1997 | Elgamal | |
| 5,706,507 A | 1/1998 | Schloss | |
| 5,708,709 A | 1/1998 | Rose | |
| 5,708,780 A | 1/1998 | Levergood et al. | |
| 5,710,883 A | 1/1998 | Hong et al. | |
| 5,721,783 A | 2/1998 | Anderson | |
| 5,732,275 A | 3/1998 | Kullick et al. | |
| 5,737,706 A | 4/1998 | Seazholtz et al. | |
| 5,748,896 A | 5/1998 | Daly et al. | |
| 5,826,014 A | 10/1998 | Coley et al. | |
| 5,864,747 A | 1/1999 | Clark et al. | |
| 5,909,589 A | 6/1999 | Parker et al. | |
| 5,974,250 A | 10/1999 | Angelo et al. | |
| 5,991,399 A * | 11/1999 | Graunke | G06F 21/10 380/228 |
| 6,038,666 A | 3/2000 | Hsu | |
| 6,067,619 A | 5/2000 | Melvin et al. | |
| 6,119,186 A | 9/2000 | Watts et al. | |
| 6,523,166 B1 | 2/2003 | Mishra et al. | |
| 6,995,669 B2 | 2/2006 | Morales | |
| 7,019,640 B2 | 3/2006 | Canich | |
| 7,030,411 B2 | 4/2006 | Krulevitch | |
| 7,162,007 B2 | 1/2007 | Elyan | |
| 7,165,484 B2 | 1/2007 | WanQ | |
| 7,176,793 B1 | 2/2007 | Hummer | |
| 7,180,418 B1 | 2/2007 | Willms | |
| 7,181,312 B2 | 2/2007 | Takehara | |
| 7,188,513 B2 | 3/2007 | Wilson | |
| 7,190,265 B1 | 3/2007 | Bohine | |
| 7,191,942 B2 | 3/2007 | Aotekar | |
| 7,233,948 B1 | 6/2007 | Shamoon et al. | |
| 7,290,144 B1 * | 10/2007 | Kitaj | G06F 21/6218 380/44 |
| 8,892,881 B2 * | 11/2014 | Giuliani | H04L 9/085 713/168 |
| 2003/0075608 A1 | 4/2003 | Atherton | |
| 2003/0126464 A1 | 7/2003 | McDaniel et al. | |
| 2003/0173408 A1 | 9/2003 | Mosher | |
| 2005/0177271 A1 | 8/2005 | Koren | |
| 2005/0225432 A1 | 10/2005 | Lindskog | |
| 2006/0177061 A1 * | 8/2006 | Orsini | G06F 21/606 380/268 |
| 2008/0263363 A1 * | 10/2008 | Jueneman | G06F 21/32 713/184 |
| 2013/0024686 A1 * | 1/2013 | Drucker | H04L 9/0802 713/155 |
| 2013/0272521 A1 * | 10/2013 | Kipnis | H04L 9/085 380/44 |

OTHER PUBLICATIONS

"Set Tool Kit for Secure Commerce", Bank Systems +Technology, p. 16, May 1996.
"Software Taps Net for Supply Data Sharing", Electronic Buyers News, Section: Purchasing, p. 50, Apr. 22, 1996.
Arnow, "DP: A Library for Building Portable, Reliable Distributed Applications", USENIX Tech Conf, pp. 235-247, Jan. 16-20, 1995.
Baentsch et al., "WebMake: Integrating Distributed Software Development in a Structure-enhanced Web", Computer Networks and ISDN Systems 27, pp. 789-800, 1995.
Bernstein, "Let's Talk: Interapplication Communications in C++ Using X Properties", The X Journal, pp. 37-44, Jan. 2, 1996.
Bryant, "Am I Bid Six? Click to Bid Six!", The New York Times, Section D1, May 13, 1996.
Chii-Ren Tsai et al., Distributed Audit with Secure Remote Procedure Calls, pp. 154-160, XP000300426, Oct. 1991.
Chris Jones, "Licensing Plan Flows from Stream", INFOWORLD, Section: News, May 6, 1996.
D. Trommer, "ECS Catalog Merges EDI/Net Platforms, Electronic Buyers News", Section: Purchasing, p. 54, May 20, 1996.
Dagenais et al., "LUDE: A Distributed Software Library", USENIX Tech Conf, pp. 25-32, Nov. 1-5, 1993.
DellaFera et al, "The Zephyr Notification Service", USENIX Winter Conference, Feb. 9-12, 1988.
Diane Trommer, "GE/Netscape Form Software Venture", Electronic Buyers News, Section: Online @EBN, p. 54, Apr. 22, 1996.
Eirich, "Beam: A Tool for Flexible Software Update", USENIX Tech Conf, pp. 75-82, Sep. 19-23, 1994.
Ellen Messmer, "Active X Pioneer Pushes Commerce", Network World, p. 33, May 6, 1996.
Flohr "Electric Money", BYTE, pp. 74-84, 1996.
Hogg "A Photometricity and Extinction Monitor at the Apache Point Observatory," The Astronomical Journal, pp. 2129-2138, 2001.
Lian "Time Delay Modeling and Sample Time Selection for Networked Control Systems," Proceedings of ASME-DSC, vol. XX, pp. 1-8, 2001.
Lodin, "The Corporate Software Bank", USENIX Tech Conf, pp. 33-42, Nov. 1-5, 1993.
M. Takahata et al., Real-Time Video-On-Demand System based on Distributed Servers and an Agent-Oriented Application, vol. 2663, 31 pp. 242-251, Jan. 1996.
Maeda et al., "Service without Servers", IEEE, 4m IEEE Workshop on Workstation Operating Systems, pp. 170-176, Aug. 1, 1993.
Marshall, "Banking on the Internet", Communications Week, p. 1, May 20, 1996.
Messmer, "Edify Software to Let Banks Open Doors Online", Network World, p. 16, May 20, 1996.
Messmer, "Start-up puts security SOCKS on Windows apps", NE, 39, May 20, 1996.
Michael B. Jones, "Interposition Agents: Transparently Interposing User Code at the System Interface", 14th ACM Symposium on Operating Systems Principals, pp. 80-93, 1993.
Nachbar, "When Network File Systems Aren't Enough: Automatic Software Distribution Revisited", USENIX Tech. Conf., pp. 159-171, Summer 1986.
Nash et al., "Vendors Deliver IS-specific apps over the net", Computer World, Section: News, p. 16, May 6, 1996.
Noble et al., "A Programming Interface for Application-Aware Adaptation in Mobile Computing", USENIX Association, vol. 8, No. 4, pp. 345-363, Fall 1995.
One Click Software Via the Web, DATAMATION, p. 16, May 1, 1995.
Ozer, Online Software Stores, PC Magazine, Section: Trends, p. 36, May 28, 1996.
Rodriguez, "Pushing the Envelope", Communications Week, Section: Internet/ Internet, p. 37, May 31, 1996.
Rupley, "Digital Bucks? Stop Here", PC Magazine, Section: First Looks, p. 54, May 28, 1996.
Semilof, "Boosting Web Business", Communications Week, Section: News Brief, p. 31, May 20, 1996.
Silwa, "Netscape Unveils New New Commerce Offerings", Networld World, Section: Internet News, p. 10, May 13, 1996.
Smalley et al., "A security Policy Configuration for the Security-Enhanced Linux", pp. 1-20, Feb. 2001.
Stream International Inc., Stream, LitleNet, BBN, and KPMG Announce Industry-Wide Initiative to Enable Wide-Scale Software Electronic Commerce, http://www.stream.com, May 12, 1996.
Tim Clark, "The Big Sell, Software Online", Inter@ctive Week, pp. 31-35, Apr. 22, 1996.
Turnoff et al, "An Electronic Information Marketplace", North Holland Computer Networks and ISDN Systems 9, pp. 79-90, 1985.
Wexler, "AT&T Sells Insurers on the Web", Network World, p. 27, May 20, 1996.
Wong, "Local Disk Depot-Customizing the Software Environment", USENIX Tech Conf, pp. 51-55, Nov. 1-5, 1993.
Yamada et al, "Electronic Distribution Program on tap", Computer Reseller News, pp. 1 and 169, Apr. 29, 1996.

* cited by examiner

SYSTEM AND METHOD FOR OBTAINING KEYS TO ACCESS PROTECTED INFORMATION

PRIOR APPLICATIONS

The present application claims the benefit of priority to U.S. Provisional Application No. 61/701,714, filed on Sep. 16, 2012, entitled "System and Method for Obtaining Keys to Access Protected Information," the entire contents of which are incorporated herein by reference in their entirety.

RELATED APPLICATIONS

The present disclosure is related to U.S. Provisional Patent Application No. 61/671,673, entitled "Secure Control Logic for Computing Environments," filed Jul. 13, 2012 (hereinafter Reference A), and U.S. Provisional Patent Application No. 61/671,676, entitled "Audit of Remote Computing Environments," filed Jul. 13, 2012 (hereinafter Reference B). All sections of each of the aforementioned applications are incorporated herein by reference in its entirety.

FIELD OF THE DISCLOSURE

The subject disclosure relates to obtaining keys to access protected information.

BACKGROUND

Access to restricted information can be controlled such that unauthorized entities are unable to access or otherwise interpret the restricted information. In some instances, one or more of the underlying information and/or communications for accessing such information can be protected through the use of other means, referred to generally as keys. Through applicant of such techniques, an unauthorized entity having access to protected information without also having the proper key finds the protected information to be unintelligible. An entity, however, such as a person or process, having a proper key can apply the key to obtain or otherwise interpret the protected information.

At least one technique for protecting information is to apply a cipher operation to the information resulting in an unintelligible cipher text version of the underlying information. A cryptographic key, however, can be applied algorithmically to the cipher text version to retrieve an intelligible version of the information. It is evident that control of access to such a key is critical for preventing access by an unauthorized entity to the information.

BRIEF DESCRIPTION OF THE DRAWINGS

Reference will now be made to the accompanying drawings, which are not necessarily drawn to scale.

DETAILED DESCRIPTION

A server can use an encryption key to decrypt authentication information thereby facilitating communication with network-accessible applications that may be remotely located from the server. Servers can also use encryption keys to decrypt files containing sensitive data, Encryption keys required by the server to obtain such authentication information and/or to access such files containing sensitive data can be stored in files on an encrypted file system. A chain of software agents, e.g., a chain software agent network, includes several software agents collaborating to conduct a common function. For example, a chain of software agents, such as the software agents (ANGELs) described in the references below, can provide an encryption key to decrypt an encrypted file system.

For example, when the server requires access to a particular encrypted file system, a chain of software agents is invoked to collectively provide the key allowing decryption of the file system so that the file system can be accessed. When the file system is no longer needed, the key generated by the software agent chain can be destroyed preventing access to the file system's unencrypted data.

In accordance with previously described capabilities of a chain of software agents, the agents can conduct covert examinations of a requesting system to determine if the request is actually from the server and whether the system is in a "safe state." If the request is fraudulent, or if the system is not in a safe state, the request to decrypt the file system does not produce a proper key, and the file system remains encrypted.

One embodiment of the subject disclosure includes a system having a memory to store computer instructions and a processor in communication with the memory. The processor, responsive to executing the computer instructions, performs operations including receiving a request to access information content from a file system and identifying a network of software agents. Each software agent is configured to conduct a respective evaluation and return a respective portion of information. The processor further performs operations including requesting that each software agent in the network of software agents conduct its respective evaluation, generating a key from the respective portions of information, and accessing by the key, the information content from the file system.

Another embodiment of the subject disclosure includes a process including receiving, by a system comprising a processor, a request to access information content from a file system. A number of software agents are identified by the system. Each software agent is configured to conduct a respective evaluation and return a respective portion of information. The process includes requesting, by the system, that each software agent in the number of software agents conduct its respective evaluation. A key is generated by the system from the respective portions of information and the information content from the file system is accessed by the key.

Yet another embodiment of the subject disclosure includes a computer-readable storage medium that includes computer instructions. The computer instructions, responsive to being executed by at least one processor, cause the at least one processor to perform operations including receiving a request to access information content from a file system and identifying a chain of software agents. Each software agent is configured to conduct a respective evaluation returning a respective portion of information. The computer instructions cause the at least one processor to further perform operations including requesting that each software agent in the chain of software agents conduct its respective evaluation, generating a key from the respective portions of information, and accessing the information content from the file system.

As described in more detail in this application, this disclosure describes a combination of the agent technology described in U.S. application Ser. No. 13/942,319 "SYSTEM AND METHOD FOR POLICY DRIVEN PROTECTION OF REMOTE COMPUTING ENVIRONMENTS" and a user created file system such as FUSE to provide keys to a server where the keys are not stored on the system where the server is running. From the server's perspective, the FUSE file system is like any other file system. In accordance with the present disclose, the FUSE file system is actually protected with keys that are develop by the agent technology described above. When the "open" command is invoked by the server against the FUSE file system, the FUSE system invokes the agent technology and decrypts the file system. The FUSE file system contains keys that are required by the server.

The illustrative examples disclosed herein relate to the use of agent technology to provide keys for servers, where the keys are not stored in the clear on the machine on which the server is located.

Software services, e.g., "servers" may require access to encryption keys, for example, one or more private keys to authenticate themselves to other applications, e.g., clients, and other servers. Alternatively or in addition, such software services require access to encryption keys to support encrypted communications with such clients and other servers. For example, a server requires access to its private key in order to establish a Secure Socket Layer (SSL) session with a new client. A mail server or web server may each use a private key to initiate secure communication with remote parties, for example, through a client-server architecture. Alternatively or in addition, a private key can be used to decrypt records stored in a database. Such keys typically are hidden on the host machine but are not stored encrypted, that is the keys are stored in the clear on a non-volatile storage medium. In other cases, the keys are encrypted, but the key to decrypt them is hidden somewhere else on a non-volatile storage medium in the clear. In at least some applications, such software services can be unattended, for example, operating in an autonomous fashion.

References to "server" in this disclosure include any software process that requires access to keys and/or other data.

References to "key" in this disclosure include restricted-access information necessary for accessing or otherwise interpreting a protected object. A key generally refers to a portion, or piece, of information (a parameter) that can be used to determine a functional output of an algorithm, such as a cryptographic algorithm or cipher. Without a key, the algorithm would produce no useful result. In an encryption context, a key can specify a particular transformation of unencrypted information, or "plaintext" into encrypted information, or "cipher text," or vice versa during a decryption process. Keys can also be used in other algorithms, e.g., cryptographic algorithms, such as digital signature techniques and message authentication codes. Protected objects can include other processes (e.g., other software applications), processors (e.g., CPUs, servers), or data (e.g., files, file systems, and databases).

Keys used by servers can be stored in a virtual file system. In at least some instances, such virtual file systems can be created by a non-privileged user using any suitable technology, such as FUSE (File system in User Space). FUSE is freely available software, allowing non-privileged users that might otherwise not have access to kernel level processes, to create their own file system, e.g., in a Unix-like computer operating system, without having to edit kernel code. Any file system, e.g., a FUSE file system, can be configured to automatically encrypt and decrypt data as it is read and written to the underlying file system.

References to software agents, or agents, refers generally to a computer program or similar executable construct that acts for a user or other program, e.g., in a relationship of agency. In some embodiments, the agent communicates with a remote sever using encrypted packages for which encryption keys are periodically strobed. At least one such class of software agents is referred to as Anonymous Networked Global Electronic Link (ANGEL) agents. Anonymity can include situations in which a location of the server is generally known only to the ANGEL agent, or a collection of such agents. In general, software agents, such as ANGEL agents include restrictions. For example, the software (ANGEL) agent can be installed only once in a predefined location and can be run only once from a predefined target. Other agents, including other ANGEL agents can be located in a share directory, e.g., on a cluster of nodes, being executed from the share directory by one or more nodes in the cluster.

Technology has been developed, such as the technology described in Reference A and Reference B, and references cited therein, whereby a key can be produced on demand from one or more software agents, whereby no key is stored in the clear or encrypted with a key that is in the clear.

As described in these references, software agents, sometimes referred to as ANGEL agents, examine a scenario and from the examinations produce values that contribute to a key. The examinations are configurable by the system designer. The key will only decrypt its target object if the examinations produce values that are within predefined ranges.

The present application discloses a system and method whereby software agents, such as the ANGEL agents disclosed in the cited references A and B, can be utilized to produce a key that will decrypt data in a file system if, and only if, (i) the request for use of the file system has been generated by an authorized server and (ii) the system itself is in a safe state, where the criteria for safe can be specified by system designers.

The private key or other keys required by the server is stored in a virtual file system, in which file data is stored encrypted on a medium such as a hard disk. The data is decrypted into volatile memory when the server requires access to it, otherwise remaining in an encrypted state.

Such an approach eliminates security danger associated with a server utilizing keys that are otherwise stored in the clear.

Figure 1:
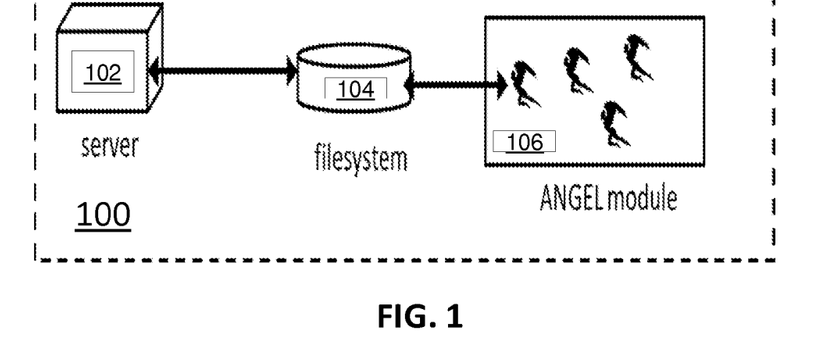
FIG. 1 depicts a block diagram of the invention, showing a server which accesses a virtual file system.

FIG. 1 provides a block diagram of a server 102 configured to accesses a file system, e.g., a virtual file system 104, using a software agent module 106. The software agent module contains various software agents to provide keys to decrypt and encrypt the file system 104. The software agent module 106 is configured to provide at least a portion of a key suitable to decrypt data stored by or otherwise accessible by way of the file system 104. In particular the software agent module 106 is configured to decrypt such data when required by the server 102 and to destroy, or otherwise render inoperable, the key when the file system 104 is no longer required by the server.

Figure 2:
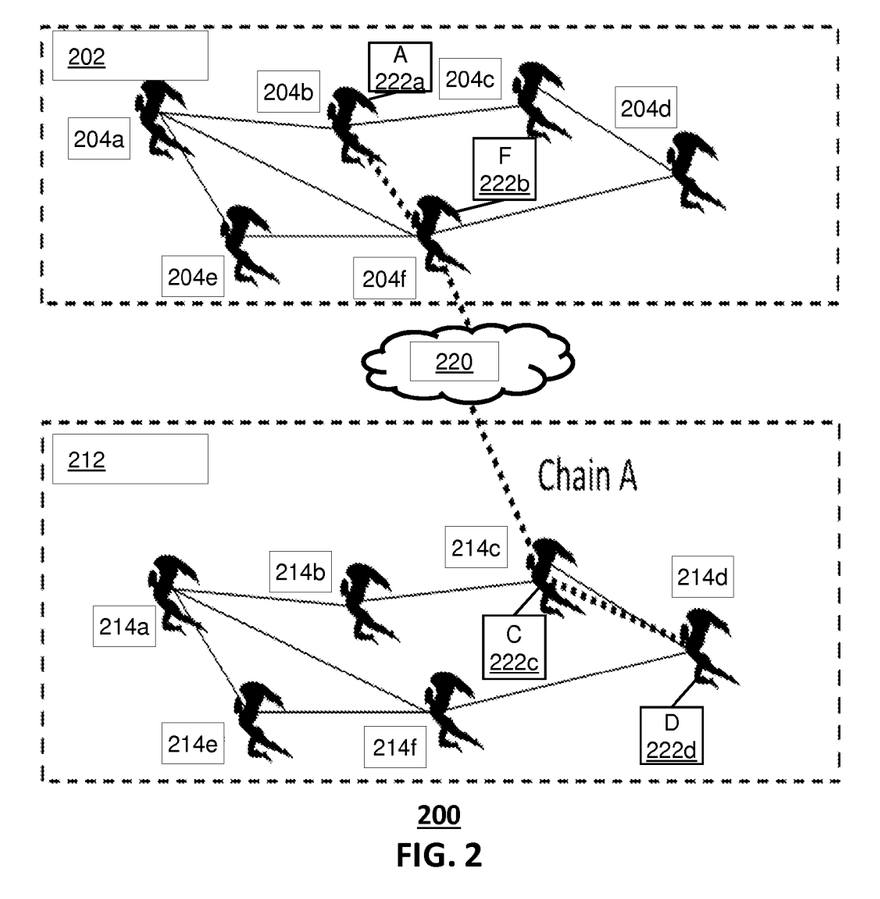
FIG. 2 depicts further details of the ANGEL module, showing various agents executing on different machines and chain of agents that produce a key.

FIG. 2 provides further details of an example embodiment of a software agent module 200, such as the software agent module 106 (FIG. 1). FIG. 2, by way of illustrative example, shows software agents (depicted with an angel icons) executing on two distinguishable devices, e.g., a first machine 202 and a second machine 212 that are separate machines, and connected, e.g., through a network, such as private network 220. Information exchanged on this network, e.g., packets of data, can be encrypted with one or more keys, for example, that have been established in accordance with Reference A. The first machine 202 includes a first group of software agents 204a, 204b, 204c, 204d, 204e, 204f (generally 204). An example of a mesh connection between the first group of software agents 204 is illustrated by the solid lines drawn between the software agents 204. Likewise, the second machine 212 includes a second group of software agents 214a, 214b, 214c, 214d, 214e, 214f (generally 214). Example mesh networks or connections are illustrated by the solid lines drawn between each of the first group of software agents 204 and between each of the second group of software agents 214. It is understood that different mesh connections are possible. It is also understood that the mesh connections can be pre-configured, e.g., before runtime, and/or established or reconfigured at any time. In some embodiments, the software agents 204 can be re-configured according to a type of test performed.

FIG. 2 also depicts an example of a software agent chain, referred to herein as "chain A," in which several agents conduct respective examinations, each providing respective material, such as cryptographic material, that collectively produces a key. Chain A in FIG. 2 consists of four such software agents, e.g., software agents 204b, 204f and software agents 214c, and 214d, by way of the private network 220. Each software agent of the chain, e.g., Chain A, conducts a respective examination, e.g., of an external feature. Each software agent of Chain A generates a respective portion of cryptographic material. For example, the first software gent 204b of Chain A generates a first portion of cryptographic material 222a and passes the first portion of generated cryptographic 222a material to the next, e.g., the second, software agent 204f in the chain of software agents. The first and second portions of cryptographic material 222a, 222b are passed to the next, e.g., the third, software agent 214c by way of the private network 220. The third software agent 214c generates a third respective portion of cryptographic material 222c. The process continues along the chain, e.g., Chain A, until a final key can be generated at agent 222d, the final agent in the example chain of software agents, having the benefit of each portion of cryptographic material generated by each of the software agents in the chain.

In at least some instances, the cryptographic material includes data, e.g., symbols, such as 1's and 0's, or other characters. In some embodiments, each portion of cryptographic material generated by a respective software agent can be added to or otherwise concatenated with cryptographic material generated from one or more preceding software agents in the chain. Consider the first software agent 204b in the example chain, labeled Chain A, producing a first portion of cryptographic material 222a (e.g., including a sequence of 1's and 0's, or other symbols or characters). The first portion of cryptographic material 222a is passed to the next software agent 204f in the chain, which produces a second portion of cryptographic material 222b (e.g., another sequence of 1's and 0's, or other symbols or characters). Software agent 204f can combine its own generated cryptographic material, F, with the cryptographic material, A, produced by preceding software agent 204b, resulting in combined cryptographic material "AF." Alternatively or in addition, the software agent 204f can pass along its own generated cryptographic material, F, with the cryptographic material, A, received from the preceding software agent, resulting in a collection of cryptographic material, A and F. The process can be repeated along such a software agent chain, until at a final software agent in the chain, 214d, sufficient cryptographic material is available (e.g., AFCD or A, F, C and D), resulting in a key that can be used to provide access to the protected object. In some embodiments, the software agents 204 can be re-configured according to a type of test performed.

The file system can communicate with some agent, for example agent 204b. Agent 204b will then start the chain by communicating with agent 204f to start the chain. Agent 204f will communicate with the last agent in the chain, e.g., agent 214d, to retrieve the key (e.g., AFCD).

The software agents can run on any arbitrary number of modules that may include software, firmware, hardware boards and combinations thereof. An arbitrary number of agents can be utilized. In some embodiments, one or more of the number and identity of agents can be varied during successive requests to access the same protected object. For example, a particular number and or identity of agents required for a particular access can itself be controlled by an algorithm.

In some embodiments, implementation of such software agent chains to collectively produce a key can be implemented without a need for changes to the server, e.g., server code, although in some cases users may choose to make minor modifications for any of various reasons, including efficiency, level of security, user interface, and the like. The server can be configured to obtain one or more keys from a particular location in a file system in accordance with software used by the server. When the server invokes standard commands, such as "file open" or "file close," the file system can be configured to communicate with a particular software agent.

When a file open command is received by the software agent, agent 204a in FIG. 2, the agent initiates or otherwise identifies an appropriate chain of software agents required to produce a key. The software agent then uses the key produced by the chain of software agents to decrypt target content of the file system into an appropriate buffer. If the key produced does not decrypt target content of the file system, the server will not be able to use the target content of the file system and will not be able find or otherwise obtain the key it requires. This is an indication that something is wrong. If, however, the key produced does decrypt the file system, the server can use the key to obtain the target content of the file system. When the server issues a file close command, any key generated by the software agent chain and decrypted data is destroyed or otherwise rendered inaccessible. The details of how the file system is decrypted and made available to the server will vary depending on the application. In some embodiments, a file-open command of an unencrypted file system initiates a procedure whereby a plurality of software agents of the network of software agents are called, the plurality of software agents providing respective portions of information.

Figure 3:
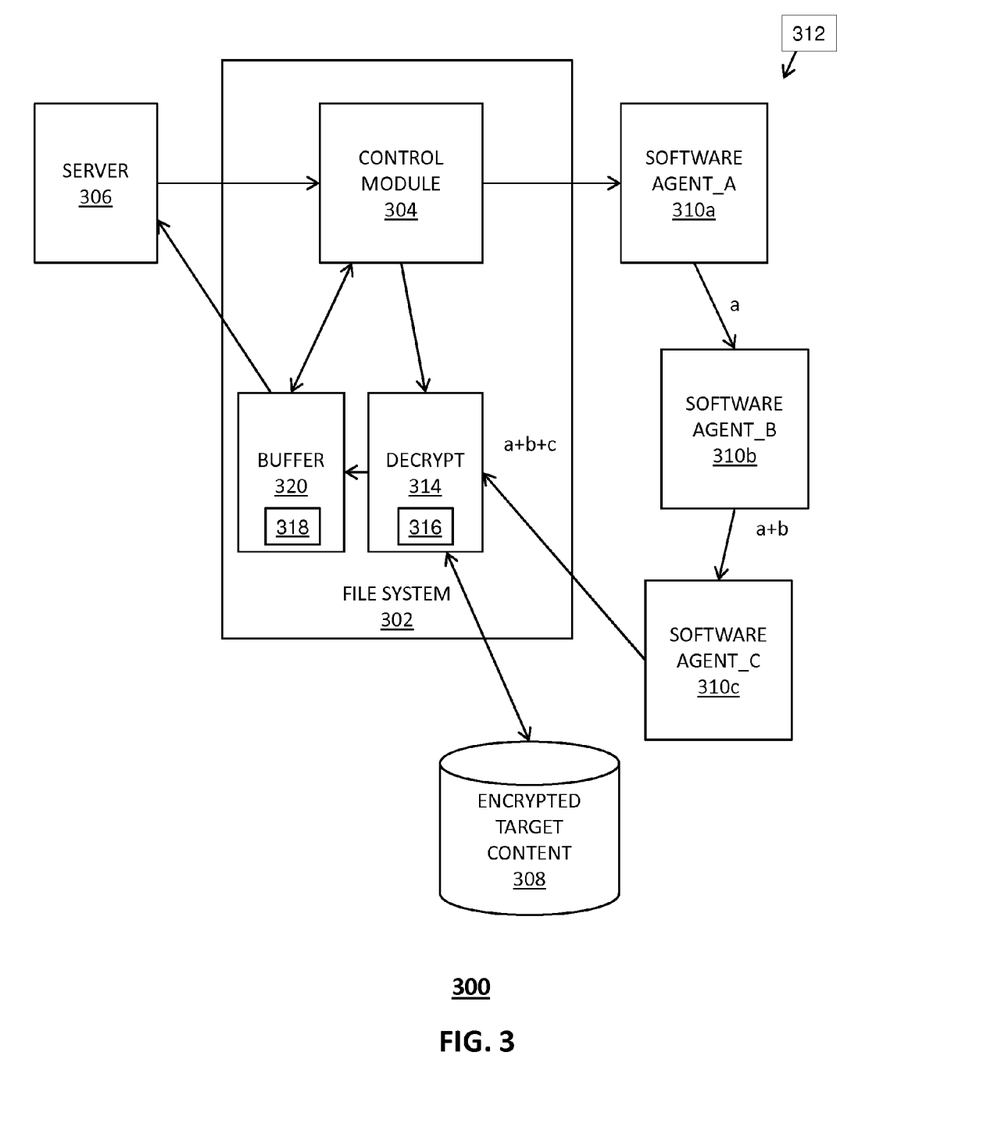
FIG. 3 depicts a more detailed embodiment of the system shown in FIG. 1.

FIG. 3 illustrates an example configuration of a system 300, in which a file system 302 includes a control module 304 receiving request from a server 306 to access target content 308 of the file system 302. The target content 308 is protected or otherwise rendered inaccessible without a suitable key. The control module 304 is configured, for example, by a software code or script, to obtain a key from a chain 312 of software agents 310a, 310b, 310c (generally 310). For example, the control module requests a key from the software agent 310a. One or more of the control module 304 and the first software agent 310a is configured with a list or other suitable identifiers of the software agents 310 in the chain of software agents 312 (e.g., the second software agent 310b and the third software agent 310c). Each of the software agents 310 in the chain 312 produces its respective portion of cryptographic information (a, b, c), which is combined or otherwise provided to the control module for combination to produce the key. In the illustrative example, a combination of contributing cryptographic material a, b, and c, which together, can be arranged to produces the suitable key, e.g., a cryptographic key, e.g., as a combination of the respective portions a+b+c. A decrypting module 314 is provided in the illustrative example. The decrypting module 314 receives or otherwise produces the key 316 from received portions of the key (a, b, c), accesses encrypted target information and decrypts the encrypted target content 308 using the key 316. In the illustrative embodiment, the decrypted target content 318 can be stored, at least temporarily, on the file system 302. A buffer 320 is provided to store the decrypted target content 318. The requesting server 306 can obtain the decrypted target content 318, e.g., from the buffer 320. In at least some embodiments, the controller 304 subsequently deletes or otherwise renders the decrypted target content 318 inaccessible after having provided the information 318 to the server 306. To the extent that any portion of the cryptographic material is inconsistent with the suitable key, the key produced or otherwise received by the control module will be unsuitable, e.g., not capable of decrypting the encrypted target content 308.

Through the process of conducting examinations utilizing a software agent in the chain, the agent chain will be able to authenticate that the server code and configuration is genuine, verifying that unauthorized changes to the server itself have not taken place. Examinations can include, without limitation, examination of details related to the requesting server. For example, an examination can determine whether the requesting server is valid or otherwise pre-authorized for accessing protected content. Additional examinations include one or more of determining whether the request actually came from a requesting server, whether the server has or has not changed one or more features of its configuration.

The software agent modules can be provided by one or more systems. Such systems can be local, remote, or combinations of local and remote systems. In at least some embodiments, such systems are network-accessible, for example, having respective addresses on one or more networks, such as the Internet.

In accordance with Reference A, the authentication functions can be encrypted and decrypted just in time for an examination.

In accordance with Reference B, the authentication function may utilize code snippets which are prepared on one machine and sent over a communication channel and execute on another machine.

Code segments, e.g., "snippets" can be utilized to examine server code to assure that the server code has not been altered.

Code snippets can be utilized to assure that only authorized software is running in the server environment.

Figure 4:
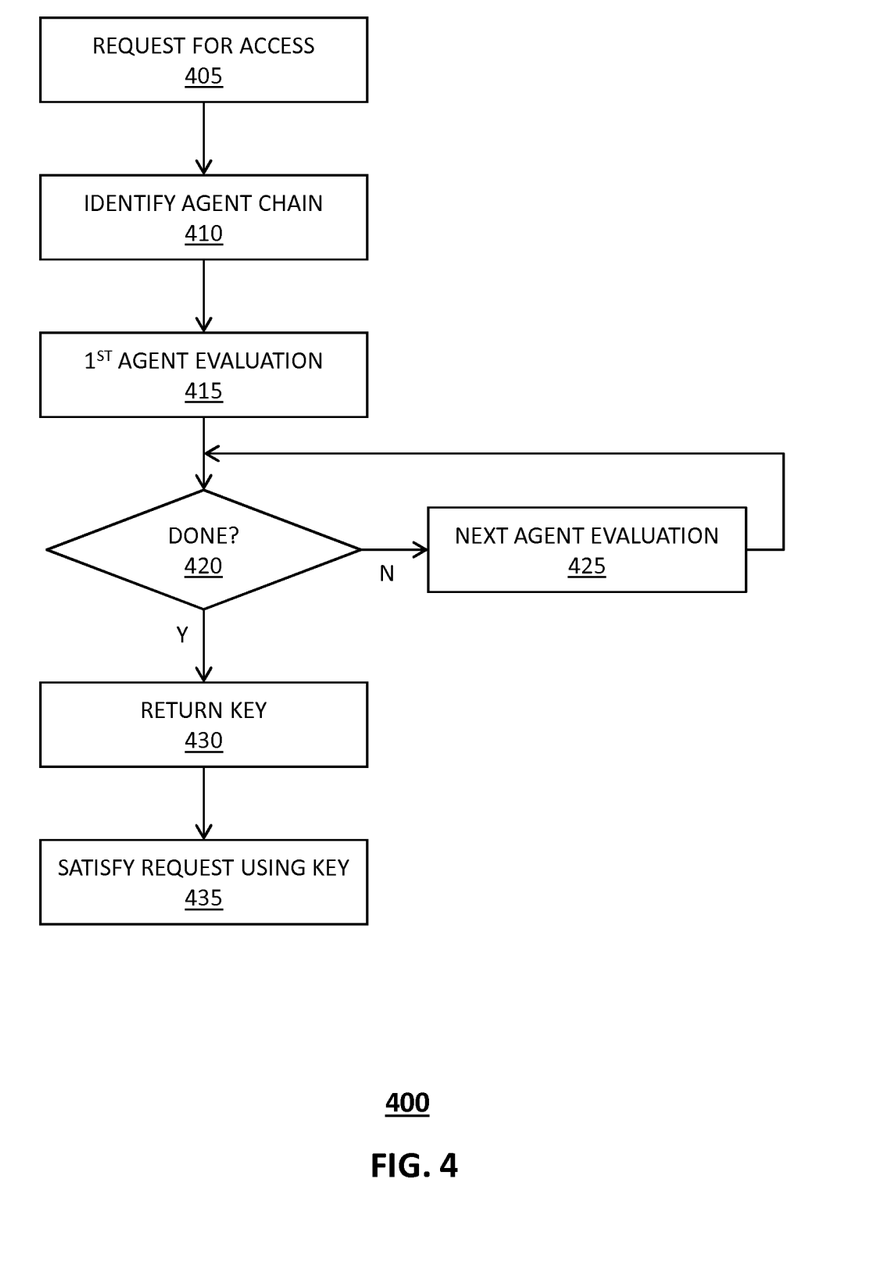
FIG. 4 depicts an example of a process for accessing content on a file system.

Illustrated in FIG. 4 is an example of a process 400 for accessing protected content. In operation, a request for access is received at 405. For example, a control module of FIG. 3 receives such a request from the server. A chain of more than one software agents is identified, for example, by the controller and/or at least one software agent at 410. A first agent of the identified chain of agents performs an evaluation, such as those described herein, at 415. A determination is made at 420 as to whether an evaluation has been performed for the last software agent in the identified chain of software agents. To the extent that an evaluation by the last software agent has not occurred, an evaluation is performed by the next software agent in the identified chain of software agents at 425. Once again, a determination is made at 420 as to whether an evaluation has been performed for the last software agent. To the extent the evaluation was not for the last software agent, evaluations for subsequent software agents in the identified chain of software agents are repeated until an evaluation for the last software agent in the chain has occurred. After having completed evaluations for all of the software agents, a complete key is returned at 430. The key can be used to decrypt or otherwise make available the requested content. To the extent, however, that any of the evaluations returned a result that was not equivalent to a predetermined value, or within a predetermined range, the completed key will not decrypt or otherwise make available the requested content.

In some embodiments, a system for managing a file system includes accessing data stored in the file system, whereby the stored data has been encrypted by a cryptographic key. A decryption key suitable for decrypting such information can be generated by a network of software agents. When the file system is accessed, a request is made to the network of agents to generate the key. The network of software agents runs a chain of such agents so that each software agent in the chain produces a respective portion of cryptographic material, which is passed to the next agent. The agents in the chain are configured to conduct respective examinations of an environment, such as an environment of the requesting server. The software agents produce cryptographic material, which depends on results obtained from the examination. A last software agent in the chain of software agents produces a key, which is a combination of the material added by preceding agents in the chain. The key, when generated correctly, allows access to the encrypted data stored in the file system. Whether the correct key is generated depends upon each of the examinations returning a result that is equivalent to an expected result, or within a range of such expected results. To the extent any of the examinations return a result that is not equivalent to or within such a range, the key will not be operative to decrypt the encrypted stored information.

At least some of the techniques disclosed herein include the use of agent technology. Such agent technology can be used, e.g., to examine a controllable platform or process and a remote controller before installation of protection software and application software. In at least some embodiments, such agent technology can be used to provide continued examination of one or more of the machines 202, 212 (FIG. 2), while one or more applications on one or more other machines, e.g., one or more of the machines 202, 212, are executing.

In some embodiments, the software agents operate entirely at the software level. In other cases, the software agents interact with hardware, such as physical sensors. Examples of sensors include, without limitation, one or more of environmental sensors, biological sensors, and more generally physical sensors and/or software sensors or monitors used to monitor application. The software or sensors that can detection values from the mission scenario, software and sensors that can detect unique characteristics of the hardware environment to prevent software from being executed in a falsified virtual environment, Environmental sensors include, without limitation, temperature sensors, humidity sensors, light sensors, position sensors, orientation sensors, altitude sensors, and motion sensors including one or more of speed or acceleration. Biological sensors include, without limitation, blood pressure sensors, blood oximeter sensors, electrical conductivity sensors, pulse rate sensors, image sensors, retinal scan sensors, finger print sensors, and the like. The system of installed software agents also is able to detect attacks and unauthorized activity. The software agents can be configured to check on one another. For example, one agent can determine if another agent is slow in responding or otherwise not available. Such indications might indicate unauthorized activity such as the presence of a debugger or an attempt to execute the software in an unauthorized environment or an attempt to execute individual software agents when the entire network of software agents is not running.

In at least some embodiments, intelligent software agents can be configured to perform collaborative tasks, e.g., by functioning in, so-called, "chains." In a chain, multiple intelligent software agents work together to perform a specific task. Examples of such chains are disclosed, e.g., in commonly owned U.S. Pat. No. 7,841,009, entitled "System and Method for Defending Against Reverse Engineering of Software, Firmware and Hardware," the entire contents of which are incorporated herein by reference in its entirety. In the present disclosure, the chains of intelligent software agents can be configured to include one or more functions. The functions can be prepared by a system design team and imposed or otherwise implemented, e.g., according to a pre-defined policy. For example, one or more of the functions can be configured to expect one or more values. Such values can be expressed as a particular value, e.g., a number, or as a range of values. In operation, if a function returns a value that is out of range, the chain can continue to execute without indicating to an observer that such an out of range result was obtained. In one embodiment, a function testing for a scenario, environmental or system value that falls within a range, produces cryptographic values with high entropy using a hash or other such technology. For example, a chain configured to produce cryptographic material, such as an encryption and/or decryption key, still produces a key, although the key will not decrypt its target object. Such an approach complicates attempts at reverse engineering and/or unauthorized attempts to access features of the system, such as sensitive information.

Sensitive technologies, sometimes referred to as sensitive or critical technologies, e.g., depending upon a particular mission or application, can be made very difficult to obtain by encryption with appropriate algorithms and keys. Policy can be embedded in one or more elements of the control system to examine one or more of the mission application and local environments, while the applications executes. A so-called "safe" environment can be identified by policy, such that sensitive information related to a mission or application can be conditioned upon a belief or conclusion of the environment is safe. Thus, if the examination reveals that the application is operating in a safe environment, the sensitive technology can be decrypted and executed; otherwise, the critical technology is not decrypted. If a system safety state changes from safe to unsafe as defined by the embedded policy, any unencrypted, e.g., "clear text" instances of the sensitive technology are deleted and/or otherwise destroyed. In at least some embodiments, a penalty can be imposed, e.g., in response to a determination that the system state is unsafe, so that the sensitive technology can never be decrypted. In some embodiments, this penalty can be covertly imposed, so that an adversary attempting to reverse engineer the system does not immediately realize that the task of obtaining a correct key has been rendered impossible.

While information is traversing the software agents of a chain, the software agents in the chain can be configured to run various functions to examine the system. Examination of the system can include examination of sensory input, process status, and status of one or more of the software agents themselves. In at least some embodiments, chains of software agents are used to generate encryption and/or decryption key material, e.g., resulting from examinations conducted by software agents of the chain. For example, respective fragments of key material determined by each software agent of the chain can be combined to produce a key. If the examinations performed by the software agents fall within a predetermined or otherwise established range, the resulting key can be used decrypt its target object; otherwise, despite the key being generated, the resulting key will not decrypt the target object. The target object can be sensitive technology embedded within an installed artifact or it can be a target object designed to test whether the system is in certain state.

It is understood that multiple chains can be created to perform different cryptographic or examination functions in a cooperative manner in order to obtain a key. Such cooperative approaches can include logical combinations of one or more individual chains, such that a desired result, e.g., generation of a successful key, is obtained only when each of the chains produces a respective result that when combined according to the logic results in the desired result.

Thus, functions can be written by system designer following appropriate format rules or written by programmers to achieve certain objectives. The ranges of successful performance of the functions are specified by the system designers. The functions, the chains, the software agents which composed the chains, and the functions a specific agent executes within a specific chain can all defined or identified, e.g., by a network definition file.

The design of a software agent network can be different for each system and can also depend on one or more of the functionality of the target system or the decisions of the system designer with respect to sensitive technology protection and the functions that the network of software agents is to perform. Using the techniques disclosed herein, it is possible to design a network of software agents that will make the sensitive technology available in an unencrypted fashion only if the system is in a predefined state as pre-chosen by the system designer during a design phase, e.g., generally conducted in a secure environment.

A procedure for installation of an angel network can be divided into several phases. In the first phase, the network of software agents can be used to gather information about a target system, e.g., the file system 104 (FIG. 1), the server 102 and/or the software agent module 106. In a second phase, a version of the network of software agents is run on the target hardware, e.g., the software agent module 106, to produce key material assuming the system is running in a safe state. The key thus produced is used to encrypt and/or decrypt the sensitive technology, such as the file system 104. In a third phase, the encrypted sensitive technology is embedded in a third version of the network of software agents. The third version of the network of software agents is used to protect the controlled process and the controller when they execute the application on the controlled process. Other versions of the network of software agents are destroyed.

Multiple instances of sensitive technology can be protected in this fashion using multiple chains which will produce different keys for each instance. It is also possible to produce functions or code fragments which can be passed from agent to agent so that the function or fragment is sent from one agent and executes on another agent. This technique can be used to examine a target execution environment by running software on the target that has never before appeared on the target.

A network of software agents can conduct examinations of a system state and optionally, at the request of the system designer, can impose a penalty so that the critical technology can never be decrypted. If the change in system state is discovered before an adversary has been able to copy the entire system to a virtualized environment, the penalty can be imposed on cryptographic material that is stored in a non-volatile medium on the system hardware. If the adversary has successfully copied the system to another medium, the penalty can be imposed within the copied artifacts. The penalty should be imposed covertly so that the adversary will not realize that the penalty has been imposed and will continue to experiment with the abstracted system rather than refreshing it. The strategy of always producing a key, even if the key does not correctly decrypt, hides from the adversary whether a penalty has already been imposed and hopefully will require the adversary to engage in months or years of fruitless reverse engineering effort.

The network definition file can be utilized to define blocks of data, such as randomly generated data that are installed into artifacts that make up the network of angels that will run on the target system. These blocks of data can be used to provide session keys that are used for initial communications among the angels and also to produce longer keys that can be used to encrypt communications among the angels. Any of the keys produced according to the techniques disclosed herein could be used to perturb blocks of installed random data so as to produce longer keys to encrypt and decrypt the critical technology.

Figure 5:
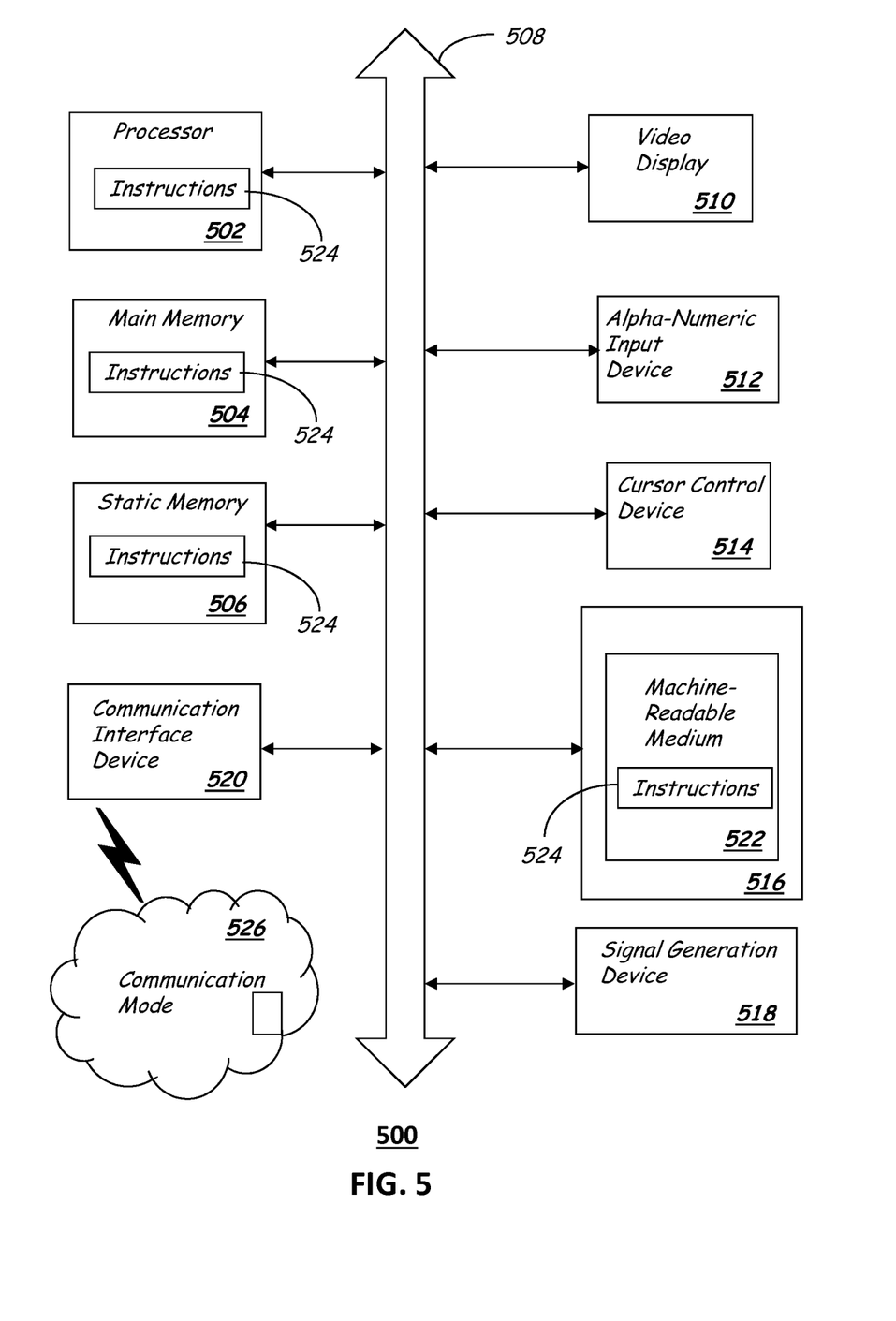
FIG. 5 is a diagrammatic representation of a machine in the form of a computer system within which a set of instructions, when executed, may cause the machine to perform any one or more of the processes described herein.

FIG. 5 depicts an exemplary diagrammatic representation of a machine in the form of a computer system 500 within which a set of instructions, when executed, may cause the machine to perform any one or more of the processes and techniques describe above. One or more instances of the machine can operate, for example, as the server 102, the file system 104, the software agent module 106 (FIG. 1), the first machine 202 or the second machine 212 (FIG. 2). In some embodiments, the machine 500 can be connected (e.g., using a communication mode, such as a public or private network 220, e.g., network to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display. The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable device may perform such operations on the controllable device directly or indirectly by way of an intermediate device directed by the computing device.

While the tangible computer-readable storage medium 522 is shown in an example embodiment to be a single medium, the term "tangible computer-readable storage medium" should be taken to include a single medium, or multiple media (e.g., a centralized or distributed database, and/or associated caches and servers) that store the one or more sets of instructions. The term "tangible computer-readable storage medium" shall also be taken to include any non-transitory medium including a device that is capable of storing or encoding a set of instructions for execution by the machine and that cause the machine to perform any one or more of the methods of the subject disclosure.

The term "tangible computer-readable storage medium" shall accordingly be taken to include, but not be limited to devices, such as: solid-state memories such as a memory card or other package that houses one or more read-only (non-volatile) memories, random access memories, or other rewritable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A system comprising:
a memory to store computer instructions; and
a processor in communication with the memory, wherein the processor, responsive to executing the computer instructions, performs operations comprising:
receiving a request to access information content from a file system;
identifying a network of software agents, each software agent configured to conduct a respective evaluation returning a respective portion of information;
requesting that each software agent in the network of software agents conducts its respective evaluation;
generating a key from the respective portions of information; and
accessing by the key, the information content from the file system, wherein each software agent of the network of software agents conducts the respective evaluation by using an authentication function comprising initially encrypted authentication functions that are decrypted prior to being run,
wherein the authentication function uses a different software agent to conduct its respective evaluation,
wherein a code snippet is communicated from a calling software agent of the network of software agents to another software agent, and
wherein the another software agent receiving the code snippet executes the code snippet in memory after receipt and returns a result to the calling software agent.

2. The system of claim 1, wherein the network of agents are configured to perform tests on the system to determine whether the system is in a safe state.

3. The system of claim 1, wherein the network of software agents makes the key from values returned as a result obtained by performance of a test.

4. The system of claim 1, wherein the network of software agents is re-configurable according to a type of test performed.

5. The system of claim 1, wherein the file system is encrypted, and a file-open command of an unencrypted file system initiates a procedure whereby a plurality of software agents of the network of software agents are called, the plurality of software agents providing respective portions of information.

6. The system of claim 1, wherein requesting that each software agent conduct its respective evaluation occurs sequentially according to a predetermined chain of software agents of the network of software agents, each software agent of the chain of software agents passing its respective portion of information to a subsequent software agent of the chain of software agents.

7. The system of claim 6, wherein a final software agent in the predetermined chain of software agents produces the key, which is a combination of the respective portions of information of preceding software agents of the predetermined chain of software agents.

8. The system of claim 1, wherein the authentication function comprises initially encrypted authentication functions that are decrypted just prior to being run.

9. The system of claim 1, where the different software agent is on another processor.

10. The system of claim 1, wherein the another software agent receiving the code snippet executes the code snippet in memory immediately after receipt and returns a result to the calling software agent.

11. A method comprising:
receiving, by a system comprising a processor, a request to access information content from a file system;
identifying, by the system, a plurality of software agents, each software agent configured to conduct a respective evaluation returning a respective portion of information;
requesting, by the system, that each software agent in the plurality of software agents conducts its respective evaluation;
generating, by the system, a key from the respective portions of information; and
accessing by the key, the information content from the file system,
wherein each software agent of the plurality of software agents conducts the respective evaluation according to one or more authentication functions,
wherein the one or more authentication functions are initially encrypted the one or more authentication functions being decrypted for execution at run time, wherein at least some of the one or more authentication functions conduct the respective evaluation using another software agent, wherein a code segment is communicated from a calling software agent of the plurality of software agents to the another software agent, and wherein the another software agent receiving the code segment executes the code segment in memory to produce a result and returns the result to the calling software agent.

12. The method of claim 11, wherein requesting that each software agent conduct its respective evaluation occurs sequentially according to a chain of software agents of the plurality of software agents, each software agent of the chain of the plurality of software agents passing its respective portion of information to a subsequent software agent of the chain of the plurality of software agents.

13. The method of claim 12, wherein a final software agent in the chain of the plurality of software agents produces the key, which is a combination of the respective portions of information of the preceding software agents of the chain of the plurality of software agents.

14. The method of claim 11, wherein the another software agent resides on another processor.

15. A machine-readable storage device, comprising executable instructions which, responsive to being executed by at least one processor, cause the at least one processor to perform operations comprising:

- receiving a request to access information content from a file system;
- identifying a chain of software agents, each software agent configured to conduct a respective evaluation returning a respective portion of information;
- requesting that each software agent in the chain of software agents conduct its respective evaluation;
- generating a key from the respective portions of information; and
- accessing the information content from the file system,
- wherein each software agent of the chain of software agents conducts the respective evaluation by using an initially encrypted authentication function that is decrypted right prior to runtime,
- wherein the initially encrypted authentication function uses a different software agent to conduct its respective evaluation,
- wherein a code segment is communicated from a calling software agent of the chain of software agents to another software agent, and
- wherein the another software agent receiving the code segment executes the code segment to produce a result and returns the result to the calling software agent.

* * * * *